United States Patent [19]
Kishi et al.

[11] Patent Number: 5,638,279
[45] Date of Patent: Jun. 10, 1997

[54] VEHICLE NAVIGATION SYSTEM AND NAVIGATION METHOD

[75] Inventors: Hiroshi Kishi, Toyota; Toru Ito, Nagoya; Akimasa Nanba, Chiryu; Hiroyoshi Masuda, Nagoya; Kyomi Morimoto, Nishio, all of Japan

[73] Assignees: Toyota Jidosha Kabushiki Kaisha, Toyota; Aisin Aw Co., Ltd., Anjo, both of Japan

[21] Appl. No.: 551,249

[22] Filed: Oct. 31, 1995

Related U.S. Application Data

[63] Continuation of Ser. No. 106,651, Aug. 16, 1993, abandoned.

[30] Foreign Application Priority Data

| Aug. 19, 1992 | [JP] | Japan | 4-220017 |
| Aug. 19, 1992 | [JP] | Japan | 4-220061 |
| Aug. 19, 1992 | [JP] | Japan | 4-220250 |

[51] Int. Cl.$^6$ .................................................. G06G 7/78
[52] U.S. Cl. .................. 364/443; 364/444.2; 340/990; 340/995
[58] Field of Search ................................ 364/443, 444, 364/449; 340/988, 990, 995; 73/178 R

[56] References Cited

U.S. PATENT DOCUMENTS

| 4,757,455 | 7/1988 | Tsunoda et al. | 364/449 |
| 4,763,270 | 8/1988 | Itoh et al. | 364/449 |
| 4,774,672 | 9/1988 | Tsunoda et al. | 364/449 |
| 4,782,447 | 11/1988 | Ueno et al. | 364/449 |
| 4,878,170 | 10/1989 | Zeevi | 364/449 |
| 4,943,925 | 7/1990 | Moroto et al. | 364/449 |
| 4,963,865 | 10/1990 | Ichikawa et al. | 340/995 |
| 4,992,947 | 2/1991 | Nimura et al. | 364/444 |
| 5,052,799 | 10/1991 | Sasser et al. | 356/152 |
| 5,067,082 | 11/1991 | Nimura et al. | 364/449 |
| 5,115,398 | 5/1992 | DeJong | 364/443 |
| 5,243,528 | 9/1993 | Lefebvre | 364/449 |
| 5,293,163 | 3/1994 | Kakihara et al. | 340/995 |
| 5,311,173 | 5/1994 | Komura et al. | 340/995 |
| 5,323,321 | 6/1994 | Smith, Jr. | 364/449 |
| 5,359,529 | 10/1994 | Snider | 364/449 |
| 5,442,557 | 8/1995 | Kaneko | 364/449 |
| 5,465,089 | 11/1995 | Nakatani et al. | 340/995 |

FOREIGN PATENT DOCUMENTS

| 4035979 | 6/1991 | Germany . |
| 61-115298 | 7/1986 | Japan . |
| 1173815 | 7/1989 | Japan . |
| 1173817 | 7/1989 | Japan . |
| 2 4285 | 1/1990 | Japan . |
| 2103584 | 4/1990 | Japan . |
| 3137679 | 6/1991 | Japan . |
| 3269317 | 11/1991 | Japan . |
| 2238870 | 6/1991 | United Kingdom . |

OTHER PUBLICATIONS

DE-Z-elektronikpraxis, "Reisdeiter–Der Autoverkehr von morgen aus der Sicht von heute" Nr. 4, Feb. 1989, pp 92–95.

*Primary Examiner*—Kevin J. Teska
*Assistant Examiner*—Leigh Marie Garbowski
*Attorney, Agent, or Firm*—Cushman, Darby & Cushman IP Group of Pillsbury Madison & Sutro LLP

[57] ABSTRACT

A vehicle navigation system realizing a discrete display of the present position of a vehicle during a period from when the vehicle reaches a predetermined distance before an intersection until the vehicle passes the intersection. Especially, in a zone a short distance before the intersection, the present vehicle position mark is fixed at the center of the displayed intersection until the travelling direction of the vehicle is changed. Thereby, even when the accuracy of monitoring of the present position is relatively low, misindication, such that the present position is displayed as if the vehicle has passed straight through the intersection in spite of not having actually reached the intersection, is avoided.

12 Claims, 9 Drawing Sheets

ACTUAL VEHICLE POSITION         DISPLAY EXAMPLE OF THE EMBODIMENT

Fig. 7A

ACTUAL VEHICLE POSITION         DISPLAY EXAMPLE OF THE EMBODIMENT

Fig. 7B

ACTUAL VEHICLE POSITION         DISPLAY EXAMPLE OF THE EMBODIMENT

VEHICLE NAVIGATION SYSTEM AND NAVIGATION METHOD

This is a continuation of application Ser. No. 08/106,651, filed on Aug. 16, 1993, which is now abandoned.

BACKGROUND OF THE INVENTION

1. Field of the Invention

The present invention relates to vehicle navigation system mounted on a vehicle for navigating the vehicle to a destination, and more particularly, to a vehicle navigation system which can indicate to a driver with a display which way he should go at an intersection and/or a junction.

2. Description of Related Art

Various system for reducing the burden on drivers have been designed and mounted onto a vehicle, including a navigation system for navigating a vehicle along a predetermined route to a destination. Such a navigation system informs a driver of an appropriate direction of travel at an intersection or junction to reach the destination. In practice, an image display device is provided on an instrumental panel of the vehicle to indicate a route to the driver. For example, Japan Laid Open Utility Model (Sho)61-115298 discloses a navigation system for indicating an appropriate route to the driver by displaying it at predetermined points, such as a intersection or a short distance before a junction. By following the navigated route, the driver can reach a destination without consulting a map.

The navigation system also detects the present position of the vehicle, and both the present vehicle position and the retrieved route are displayed for guidance. The detected present position is superimposed on the pre-stored map information display, and when the vehicle approaches the intersection, an arrow or the like indicates the appropriate direction on the display including the intersection or junction. Such a navigation system is disclosed in Japan Laid Open Patent (Hei)1-173815, as well as the above Laid Open Utility Model.

The present vehicle position may be detected based on distance and direction data from a distance sensor and a direction sensor, respectively, or by detecting a radio wave from a satellite, or by a hybrid method mixing the above two concepts. However, in either method, a detection error occurs and error correction is required for detecting the present position relatively accurately. Conventionally, such error correction is made after detecting, with a steering sensor, the direction to which the vehicle is turning.

In the above described system, the present position of the vehicle is displayed in real time, and when an error occurs in the detection of the present position, the detected present position is displayed as if the vehicle has passed the intersection in spite of not having reached the intersection.

In other words, detected and displayed position does not agree with the actual present position and is displayed ahead of the actual position, because the error correction has not yet been made just before turning at the intersection. This may cause a misinterpretation by the driver.

Figure 1A:
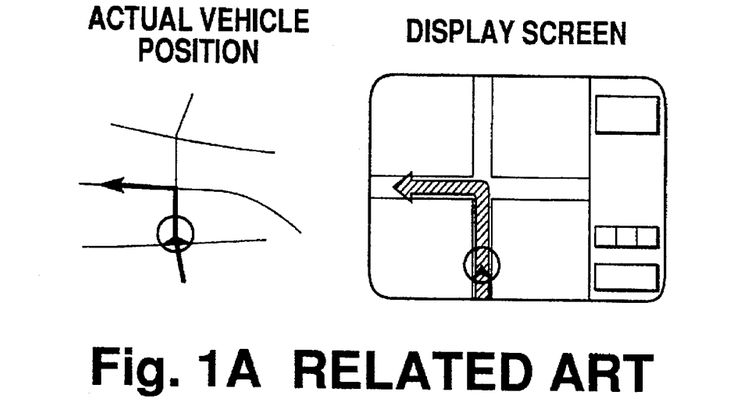
FIG. 1A shows an actual position of a vehicle and a corresponding display of a conventional system, where the vehicle is a long distance before the intersection.
Figure 1B:
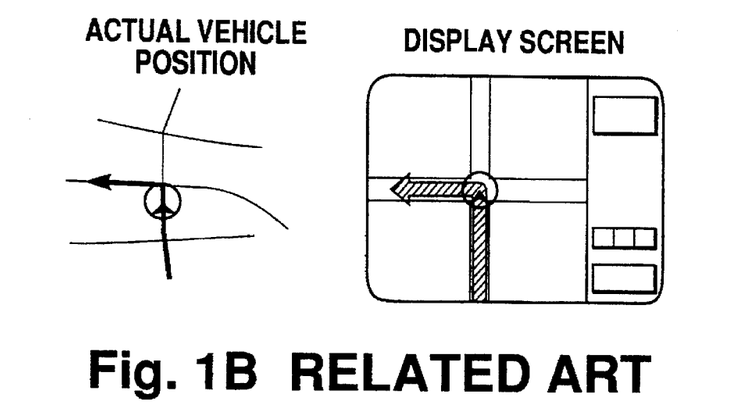
FIG. 1B shows an actual vehicle position and a corresponding display of a conventional system, where the vehicle is approaching the intersection, wherein the display indicates that the vehicle has reached the intersection although the vehicle is actually located before the intersection.
Figure 1C:
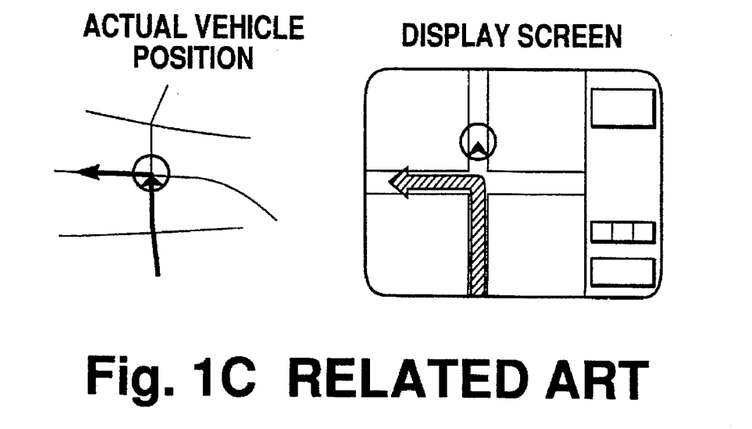
FIG. 1C shows an actual vehicle position and a corresponding display of a conventional system when passing the intersection, wherein the display indicates that the vehicle has passed straight through the intersection although the vehicle is actually located at the intersection.

As shown in FIGS. 1A, 1B and 1C, a gap exists between the actual position of the vehicle and the corresponding display (i.e. detected position) in a conventional system. FIG. 1A illustrates a vehicle approaching an intersection where it should turn left, FIG. 1B shows a vehicle just before the intersection, and FIG. 1C shows a vehicle which is at the intersection. In FIG. 1B, although the actual position of the vehicle is still before the intersection, the display indicates that it has already reached the intersection because of the error in detection of the present position. Further, in FIG. 1C, although the vehicle is in the middle of the intersection in reality, display shows that it has passed straight through the intersection. The driver may misrecognize that he has reached the subject intersection and may turn left (or right) at an another closer intersection.

SUMMARY OF THE INVENTION

The object of the present invention is to solve the above problem, and to provide an improved vehicle navigation system which does not cause a misinterpretation around an intersection even where the detectivity of the present position is relatively low.

It is an another object of the invention to provide a vehicle navigation system which can correctly guide the driver at an intersection even when an error occurs in the present position detection.

In order to achieve the above objects, the vehicle navigation system according to the present invention comprises means for storing information about the route to the destination, means for detecting a present position of the vehicle, means for displaying map information about the present position and its surroundings, means for detecting if the vehicle has passed any intersections existing in the predetermined route, and discrete display means for starting discrete display of the present position on the display means when the vehicle has reached a predetermined distance before the intersection and for finishing the discrete display when the passage of the intersection is detected by the passage detecting means.

The discrete display means keeps the discrete display mark at the intersection while the vehicle has reached a predetermined distance before the intersection and is approaching the intersection. Hence, although an error is included in the detected and displayed present position, false display, for example, a display wherein the present position is displayed as if the vehicle has passed the intersection which the vehicle has not yet actually reached, can be avoided.

The discrete display means may be set to start the discrete display of the present position when the vehicle has reach a predetermined distance before the intersection and then to move the displayed point in a step by step fashion approaching the intersection. This also prevents the false display such that the actual distance to the intersection is different from the displayed distance, although an error is included in the detection of the present position. With such a discrete display, a false display caused by an error between the actual position and the displayed position is avoided. Further, knowing in advance that the displayed present position is only a rough estimate and includes an error, the driver does not expect a very precise display.

The intersection-passage detecting means determines the passage of the intersection by monitoring the change of the travelling direction of the vehicle when it turns right or left. The change of the travelling direction can be sensed by a steering sensor for detecting a steering rotation angle, or by an inertia navigation unit or a wheel speed sensor for detecting a revolution-difference between the left and the right wheel, or by combination of these two.

The intersection-passage detecting means may also determine the passage of the intersection by detecting a single wave (or beacon) generated from a signpost in the vicinity of an intersection. In this case, an intersection-passage can be detected even when the vehicle goes straight.

As another aspect of the invention, a vehicle navigating method is provided, which comprises steps of storing information about a predetermined route to a destination, detecting the present position of the vehicle, displaying map information around the present point and its surroundings, starting a discrete display of the present position when the vehicle has reached a predetermined distance before an intersection, detecting a passage of the intersection, and finishing the discrete display when the passage of the intersection is detected.

The discrete display means keeps the discrete display of the present position at the intersection when the vehicle has reached the predetermined distance before the intersection and is approaching the intersection.

The discrete display means may gradually move the discrete display mark step by step toward the intersection when the vehicle has reached the predetermined distance before the intersection and while the vehicle is approaching the intersection.

The passage of the intersection is detected based on the change of the travelling direction of the vehicle, which can be detected by a steering sensor, or an inertia navigation unit or a wheel revolution speed sensor.

The passage detecting means may determine the passage of the intersection by detecting a single wave from a sign post set in the vicinity of an intersection.

Thus, according to the present invention, although an error is included in the display of the present position around intersections, misinterpretation by the driver can be avoided, which may be caused by false display of the present position near intersections or junctions.

DETAILED DESCRIPTION OF THE PREFERRED EMBODIMENT

The preferred embodiment will now be described referring to the drawings.

Figure 2:
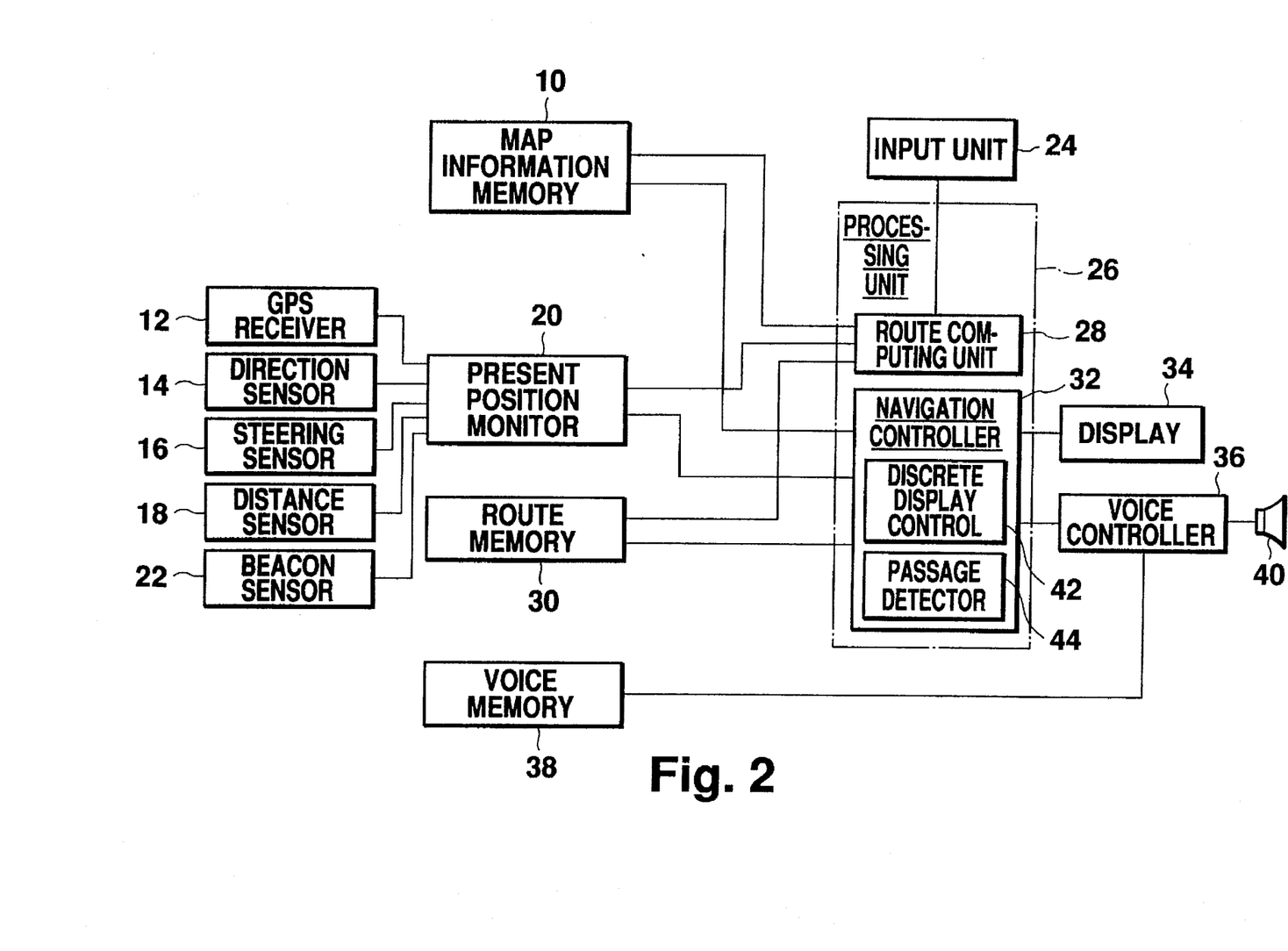
FIG. 2 is a block diagram showing a preferred embodiment of the present invention.

FIG. 2 illustrates a structure of the navigation system of the present invention. A map information memory 10 stores information about routes, geographical names (including names of rivers, places, towns, etc.), names of buildings, and so on. This information can be read out in response to driver's needs. This system also includes a GPS receiver 12 for monitoring the present position of the vehicle which utilizes the navigation satellite system (hereinafter, referred to as GPS: Global Positioning Satellite), a direction sensor 14 for detecting a travelling direction of the vehicle based on the geomagnetism, a steering sensor 16 detecting a change of travelling direction based on the steering angle, a distance sensor 18 for detecting a travel distance based on the revolution speed of the wheels, and a present position monitor 20 for detecting the present vehicle position based on the above detected information.

The system also includes a beacon sensor 22 for receiving a beacon (that is, a signal wave) from a signpost located at the edge of the road. The beacon and the signpost is a system for informing a driver of traffic information by transmitting information concerning, for instance, a traffic jam, to travelling vehicles. Such information is displayed on a display mounted in the vehicle. The information transmitted by the beacon includes an identification code of a signpost from which the beacon is generated. By detecting the identification code, the driver can identify the intersection. Further, by detecting the passage of the signpost, it can be detected if the vehicle has passed the intersection.

When navigating to a destination, the destination is input to the navigation system by pointing to it on the screen of the display or by inputting the name of the destination. The route to the destination is computed with the route computing unit 28, which is included in the processing unit 26, based on the present positions provided by the present position monitor 20, and the computed route is stored in the route memory 30.

After inputting the destination and calculating the route, actual navigation is carried out. A navigation controller 32 included in the processing unit 26 reads out map information around the vehicle from the map information memory 10, and displays it on the display 34 which is superposed with the present position, the travelling direction, and the predetermined route stored in the route memory 30.

Figure 3:
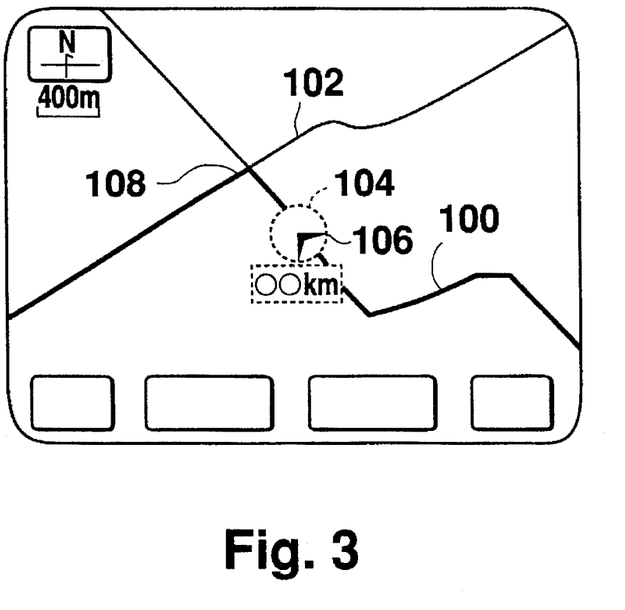
FIG. 3 is an example display of the navigation system according to the present invention.

The display 34 is furnished in the instrument panel installed near the driver's seat. The driver or passengers can confirm the present position of the vehicle and know the subsequent route to be followed by watching the display 34. An example of such a display is shown in FIG. 3. The selected route is indicated as a solid bold line 100 while the other roads as regular solid lines 102. The present position of the vehicle is shown as a circle 104, and the travelling direction as a wedge shaped arrow 106. The selected route may be distinguished by changing the colour from the other roads.

Figure 4:
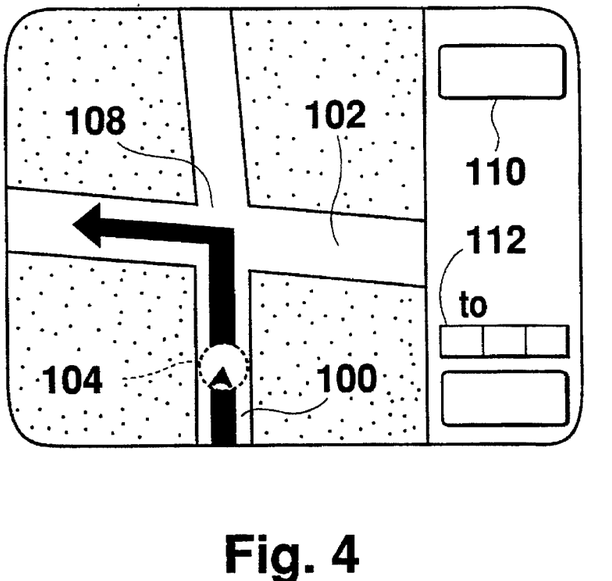
FIG. 4 is an example of enlarged display when the vehicle approaches an intersection where it should turn right or left.

When the vehicle approaches the intersection 108 where the travelling direction must be changed, the display is switched to the one shown in FIG. 4, and the name of the intersection and the distance to the intersection are displayed at 110 and 112 respectively. At the same time as the above-described display-switching, the navigation controller 32 generates a command to a voice controller 36 to generate an audible instruction corresponding to the guidance at the intersection. The voice controller 36 reads out digital data stored in the voice memory, and converts it into analog signals to drive a speaker 40. A direction, for example, "Turn left at the next intersection" is given from the speaker to direct the driver. The audible direction is continued at a predetermined interval until the vehicle has passed the intersection.

Passage of the intersection is detected by a passage detector 44 shown in FIG. 2. The present navigation system enables detection of the intersection with two different detecting methods, namely, detection based on the change in the travelling direction and based on the beacon generated from a signpost.

The detection based on the change in the travelling direction is adopted for determining the passage of the intersection where turning right or left is required. In this case, when the vehicle reaches a predetermined distance before the intersection, the mark indicating the present position is fixed to the displayed intersection, and the driver is informed by both display and voice sound to turn left (or right). When the driver turns left (or right) according to the instruction, the travelling direction is changed. The detection of this directional change means that the vehicle is turning and passing the intersection, and the directional change is detected by a directional sensor 14, a steering sensor 16 and a distance sensor 18.

The steering wheel is rotated in order to change the travelling direction, and the distance sensor 18 senses how long the steering angle is maintained. By detecting these factors, the degree of change in the travelling direction can be determined. The passage of the intersection can be detected by confirming the agreement between the amount of change and the contour of the intersection pre-stored as map information. The directional change can also be detected by detecting a geomagnetic change with a direction sensor 14.

By using the above two detecting means for detecting directional change, accurate detection of intersection-passage can be achieved.

At an intersection where a signpost for generating a beacon is set, intersection-passage detection using the beacon is also made. By using this method, straight passage through the intersection without directional change can also be detected.

According to the embodiment of the present invention, when the vehicle has reached the intersection where the route selection should be made, an enlarged road map around the intersection is displayed as shown in FIG. 4, and the discrete display of the present vehicle position is started by the discrete display controller 42 (see FIG. 2). The discrete display will be described referring to FIG. 5.

Figure 5:
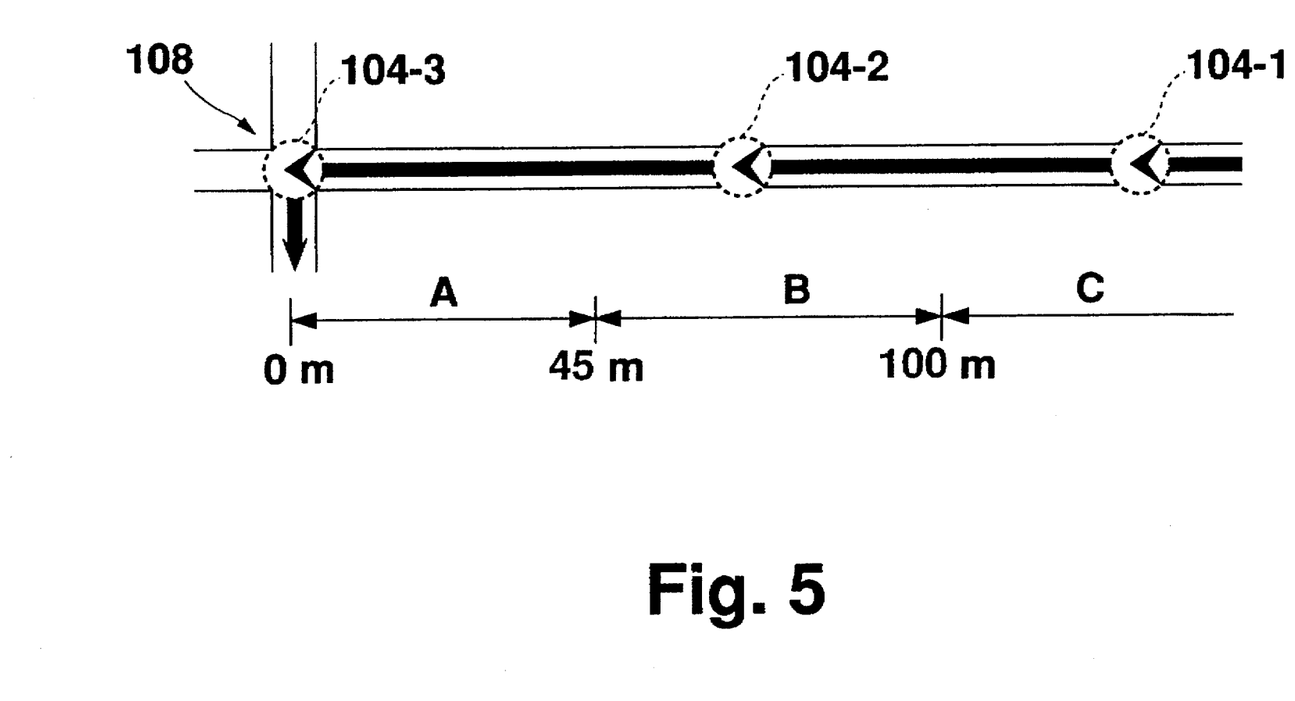
FIG. 5 is a display explaining the display of the present system in the vicinity of the intersection.

In FIG. 5, the vehicle is running from right to left and is turning left at the intersection 108 (toward the bottom of the diagram). As shown, three zones A, B, and C are defined before the intersection. Zone A is from the center of the intersection (0 m) to 45 m before the Intersection, zone B is from 45 m to 100 m before the intersection, and zone C is more than 100 m before the intersection. When the display is switched to the enlarged display, the vehicle position monitored by a present position monitor 12 is normally in the zone C, and the displayed circle mark is fixed at position 104-1. This mark position is 100 m before the intersection. When the vehicle is entering the zone B, the circle mark is moved to and fixed at the position 104-2, which is 60 m before the intersection. When the vehicle is further approaching the intersection and entering the zone A, the mark is moved to and fixed at the center of the intersection 104-3. After passing the intersection, such a discrete display is terminated, and continuous real time display is started.

Thus, the invention provides a display divided into three zones, that is, a far zone (104-1), a middle zone (104-2) and a near zone just before the intersection (104-3). With such a discrete display, although the monitoring is rough, it does not cause the driver to misinterpret the intersection. More specifically, since the present position mark is fixed at the center of the intersection until the vehicle has actually turned and passed the intersection, a misindication that the vehicle position is displayed as if it has passed straight through the intersection, is avoided.

The embodiment adopted three zones for discrete display, however, of course another number of zones can be set for discretely displaying the present vehicle position.

The "discrete display" in accordance with the present invention is not limited to the display based only on the distance between the vehicle and the intersection, but is available for discretely displaying the present vehicle position mark based on the time lapse after reaching a predetermined distance before the intersection, or on any other parameter.

Now, the second embodiment will be described. In this embodiment, one zone discrete display is adopted. With this method, when the vehicle has reached a predetermined distance before the intersection, the displayed vehicle position is fixed at the intersection.

Figure 6:
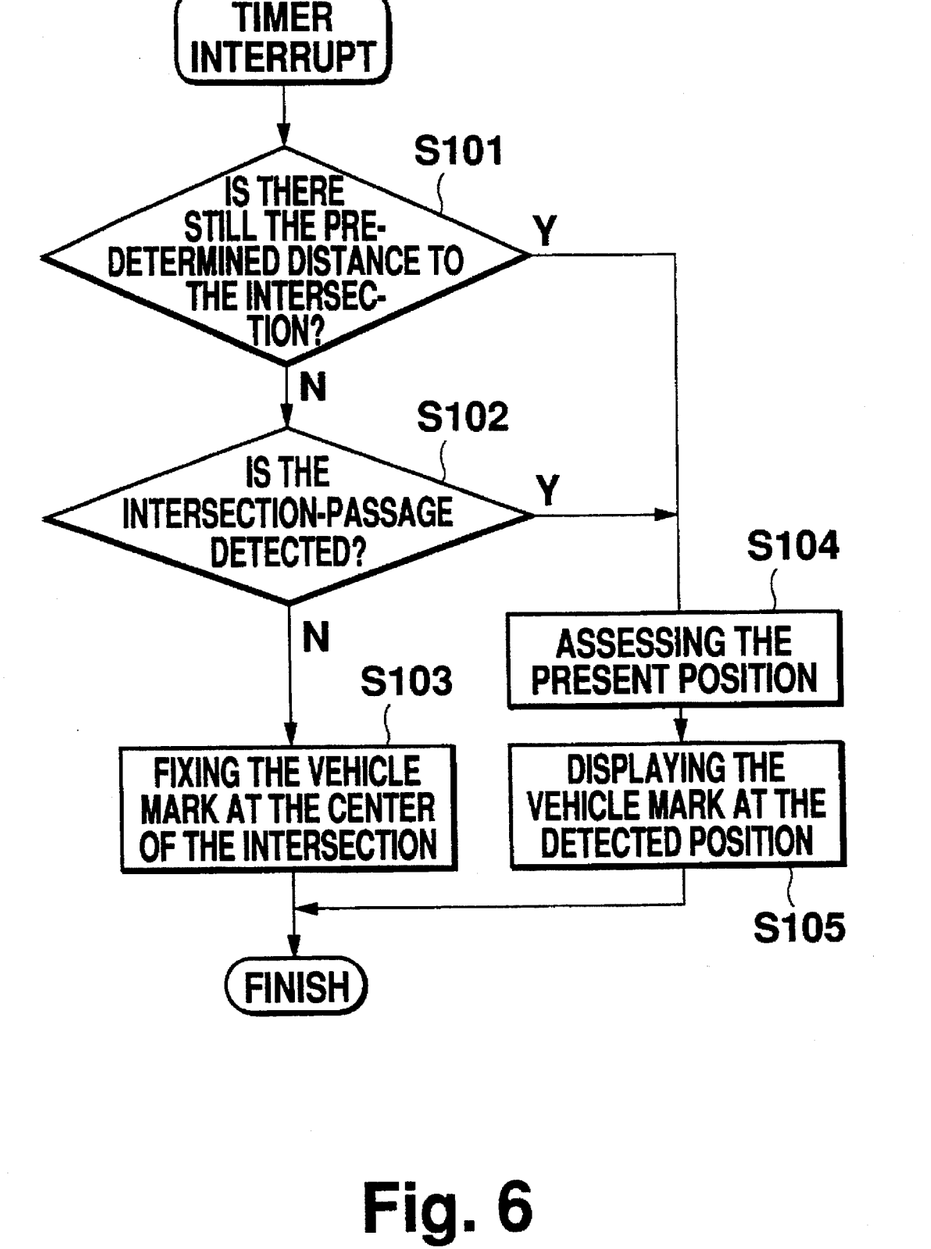
FIG. 6 is a flow chart showing an operation of the embodiment according to the present invention.

FIG. 6 is a flow chart showing an operation of the discrete display controller 42. First, it is tested to determine if a predetermined distance to the intersection to be negotiated still remains (S101). This test preformed by detecting whether or not the distance between the detected vehicle position and the intersection is shorter than a predetermined distance (for example, under 200 m or not). If it is untrue (that is, if the predetermined distance to the intersection does not remain), it is then tested if the vehicle has passed the intersection by detecting a signal from the steering sensor 16 or signpost (S102). If it is judged that the predetermined distance to the intersection is not remaining and the vehicle has not passed the intersection yet, the present position mark is fixed at the intersection on the display. In this case, although the detected vehicle position is changing, the mark is not moved from the center of the intersection as long as passage of the intersection is not detected.

On the other hand, in the case where it is detected that the predetermined distance to the intersection is still remaining, or that the vehicle has passed the intersection, the operation returns to the routine and takes in data about the present position (S104), and then displays the present position mark in real time at its detected position (S105).

Figure 7A:
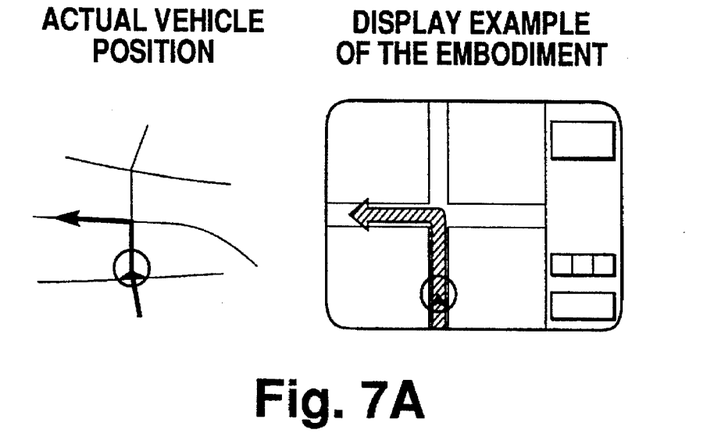
FIG. 7A shows the actual vehicle position and a corresponding display of the present embodiment, where the vehicle is a long distance before the intersection.
Figure 7B:
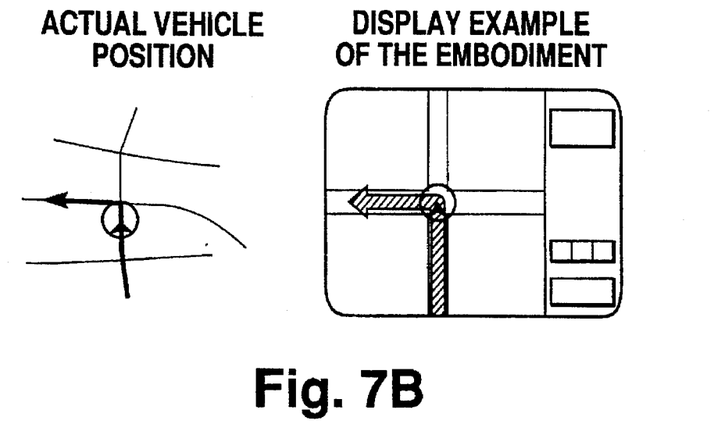
FIG. 7B shows the actual vehicle position and a corresponding display of the embodiment of the invention, where the vehicle is approaching the intersection, wherein the display also indicates that the vehicle has reached the intersection because of the error in detection of the present position.
Figure 7C:
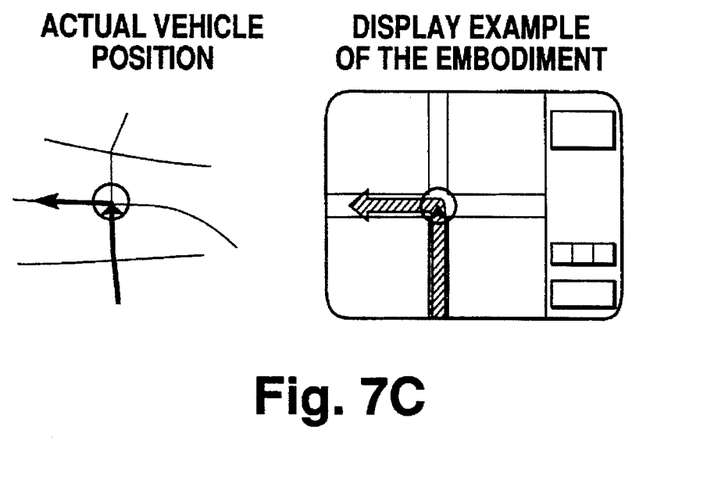
FIG. 7C shows an actual vehicle position and a corresponding display of the embodiment of the invention in the vicinity of the intersection, wherein the displayed mark is fixed at the intersection until the vehicle actually reaches the intersection.

FIGS. 7A, 7B and 7C show the actual vehicle position and the corresponding displayed (i.e. detected) position by the aforementioned operation. The vehicle is approaching the intersection to turn left in FIG. 7A, and entering the predetermined zone just before the intersection in FIG. 7B, and has reached the intersection in FIG. 7C.

As shown in FIGS. 7B and 7C, after the vehicle enters the predetermined zone just before the Intersection, the present position mark is fixed at the center of the intersection on the display regardless of the actual advance of the vehicle until the vehicle completely turns left (or right). This system, therefore, differs from the conventional system shown in FIGS. 1A, 1B, and 1C. The driver can understand that he is approaching the intersection to be negotiated and properly turn to the direction along the navigated route.

Thus, in the second embodiment, the present position mark is fixed at the intersection at the predetermined zone before the intersection, while it starts to move in response to the detected vehicle position after passing the intersection, thereby, the driver is appropriately directed even though the detected present position contains an error.

Figure 8:
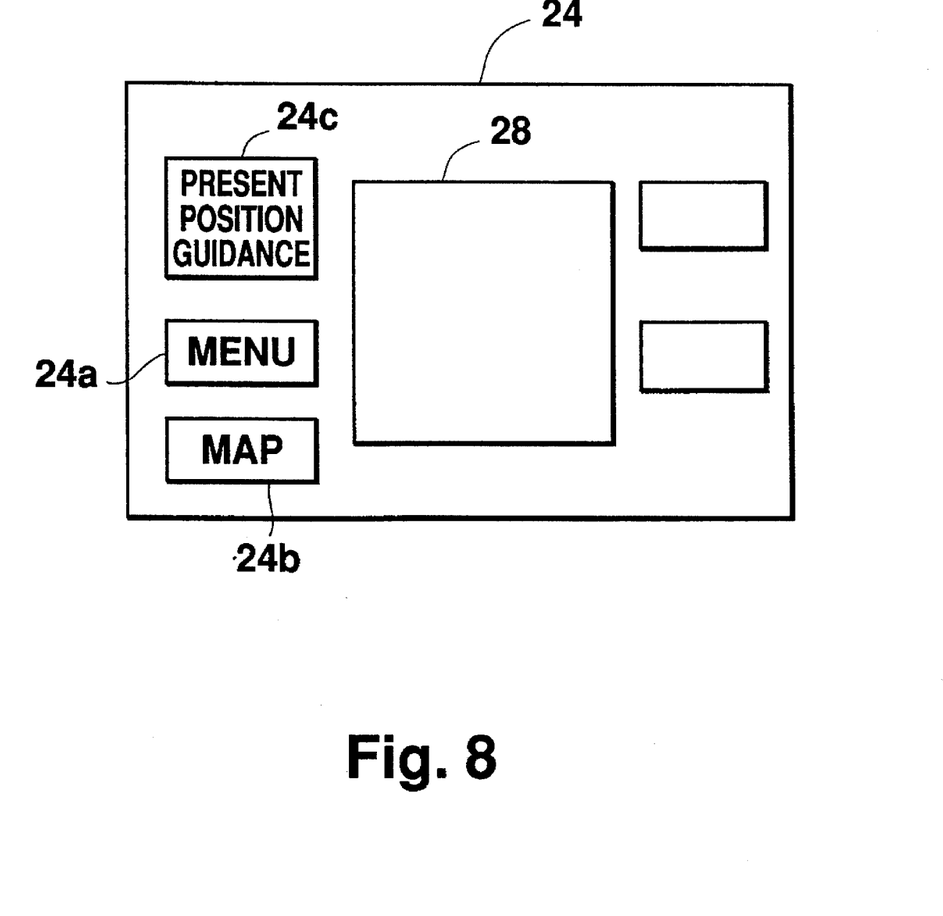
FIG. 8 shows a structure of the input portion of the system.

FIG. 8 shows a structure of the input unit 24. The screen of the display 34 consists of touch panels and functions as a part of input unit 24. The driver can input data by touching a displayed geographical name, etc. on the display screen. The input unit 24 includes a menu key 28a for returning to the menu to select operations such as input of destination or volume adjustment, a map key 28b for displaying a map, a present position/guidance key 28c for returning to the present-position display or requesting voice guidance on the current situation, and so on.

Figure 9:
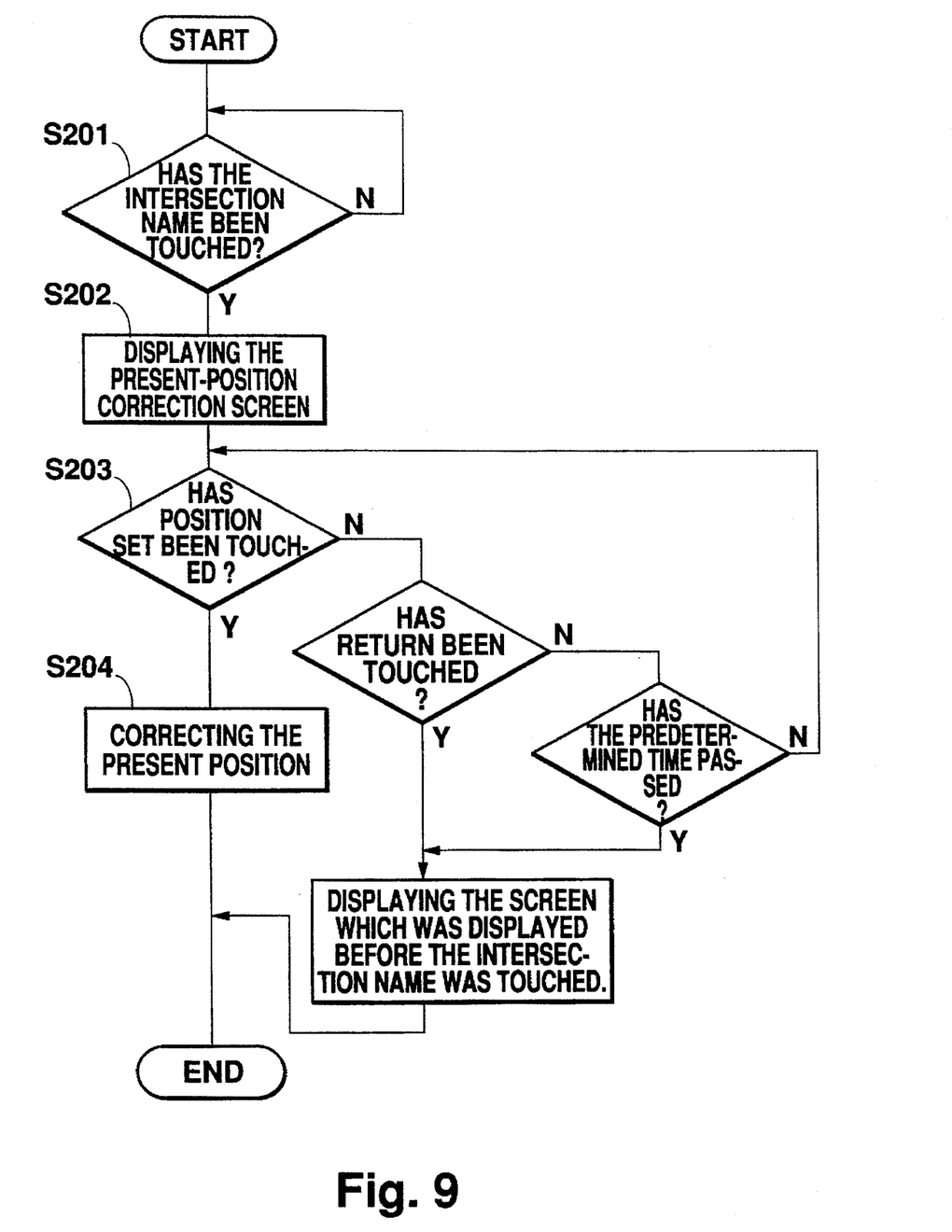
FIG. 9 is a flow chart of a present-position correcting operation according to the present invention.
Figure 10:
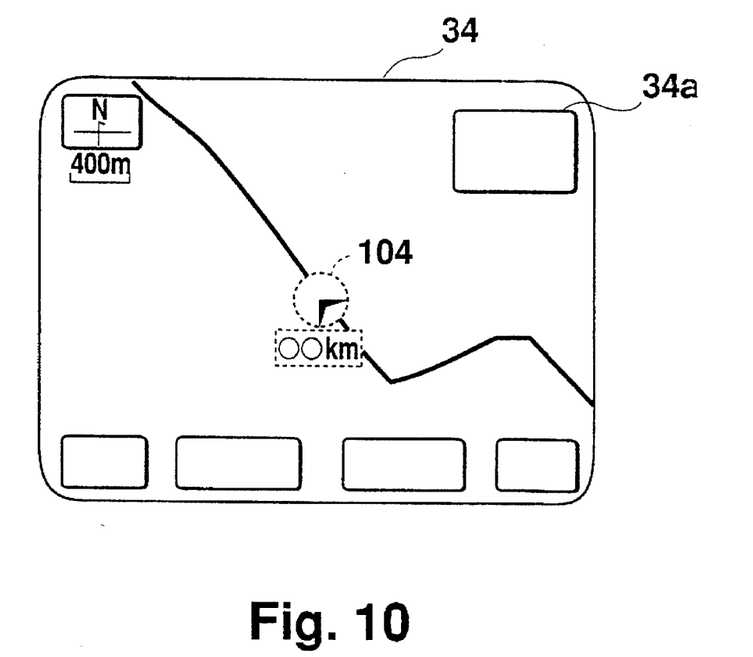
FIG. 10 is an example display according to the present invention.
Figure 11:
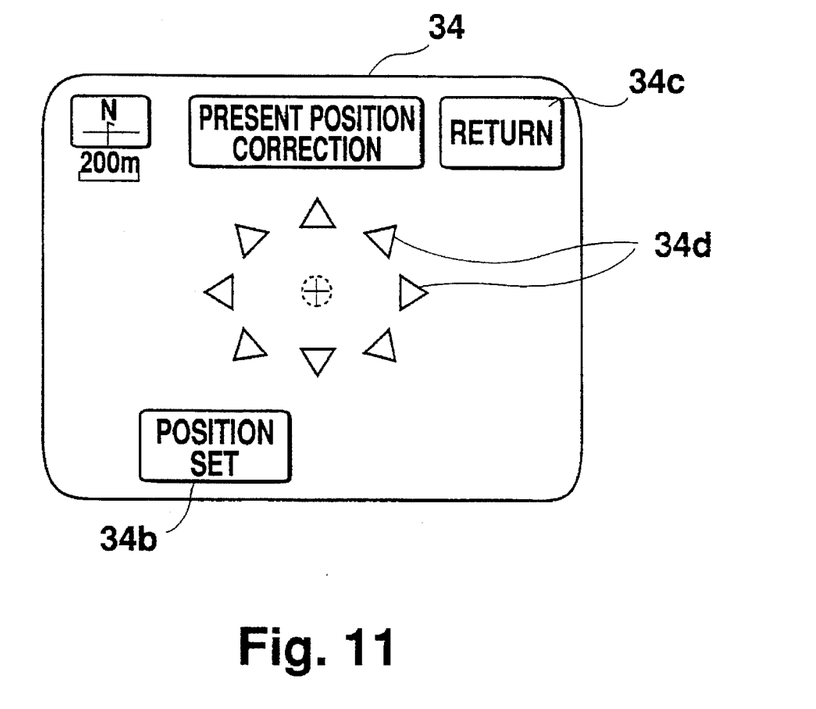
FIG. 11 is an example display when correcting a present position.

In the embodiments of the present invention, correction of the detected present position is enabled each time the vehicle passes a key point such as an intersection. The operation for correcting the detected present position will be described referring to FIGS. 9–11. When the vehicle passes straight through the intersection, the name of the intersection is displayed at an intersection-name display 34a in the upper-right portion of the screen on which the map around the present position is displayed, as shown in FIG. 10. In this situation, if the driver touches the intersection-name display 34a (S201), the screen is switched to a present-position correcting display as shown in FIG. 11 (S202). In the present-position correcting display, a position set key 34b and a return key 34c are displayed at bottom left and top right portions respectively on the screen, and the displayed present vehicle position is corrected so that the mark is on the intersection. Although the road map display is omitted from this drawing for clarity, the road map is also displayed in the actual system. Correction wedges (triangle marks) 34d can also be displayed around the present position in the screen, but the correction of present position is not made by these correction wedges during driving.

Under this condition, it is judged whether the position set key 34b is touched (S203), and if it is touched, present-position correction is made (S204) by correctly setting the vehicle position monitored by the present position monitor 20 onto the displayed intersection stored in the map information memory 10.

On the other hand, if the position set key is not touched, it is checked whether or not the return key 34c is touched (S205). If the return key 34c is touched, it returns to the normal navigation display without correcting the present position, while if the return key 34c is not touched, it is checked if a predetermined period has passed (S206). If the predetermined period has not yet passed, the operation returns to S203, and if it has passed, it returns to the normal navigation display.

Thus, according to the present invention, present position correction is not performed by simply touching the intersection-name display 34a, but it is only performed when the position set key 34b is touched. Hence, even if the driver carelessly touches the intersection-name display 34a, unintended present position correction is avoided.

Under this system, a distinctive mark or guide, such as a specific building, is displayed on the navigation screen at any key points. Accordingly, correction of the present-position is preferably made not only at an intersection, but also at each key point.

Further, when the vehicle approaches the intersection to be negotiated, the intersection name is also displayed on the screen shown in FIG. 4. If the driver touches the intersection-name display 110, the screen is switched into the present-position correction screen, and when the driver further touches the position set key, the present position is corrected in the same manner as the aforementioned operation.

Thus, according to the present invention, correction of the present position can be made and the corrected vehicle position is displayed at a desired frequency, which allows the driver to grasp the present position relatively precisely. Especially, accurate indication of the present position is required for voice guidance, such as, for example, "300 m ahead *** an intersection **turn left", because inappropriate correction of the present position results in incorrect voice guidance. With the present navigation system, improper correction caused by the driver's misoperation is prevented, and present-position correction is effectively carried out. In the embodiment, the vehicle position detected at the time of touching the intersection-name display 34a in S201 is corrected to and displayed at the intersection in S204.

As described above, the present navigation system prevents misinterpretation of the display around an intersection even if an error is contained in detection of the present vehicle position. Moreover, improper correction of the present position when passing the intersection is avoided by the two step operation, that is, touching a intersection-name display key 34a first and then a position set key 34b.

We claim:

1. A vehicle navigation system for navigating a vehicle along a predetermined route, comprising:

storing means for storing information about the predetermined route to a destination;

position detecting means for detecting a present vehicle position;

displaying means for displaying map information and a mark representing the present vehicle position relative to the map information;

intersection detecting means for detecting whether the vehicle has passed an intersection in the predetermined route to the destination; and display control means for operating the displaying means in a first display format in which the mark moves substantially continuously relative to the map information as the position of the vehicle changes and for operating the displaying means in a second display format, the display control means switching the displaying means from the first display format to the second display format responsive to the vehicle reaching a predetermined distance before the intersection, the display control means terminating the second display format responsive to a determination by the intersection detecting means that the vehicle has passed the intersection, wherein the second display format includes moving the mark in increments relative to the map information toward a displayed intersection corresponding to the intersection being approached by the vehicle as the vehicle moves toward the intersection and maintaining the mark at the displayed intersection until the vehicle has passed the intersection.

2. A vehicle navigation system as set forth in claim 1, wherein the intersection detecting means detects whether the vehicle has passed the intersection based on a change in a travelling direction of the vehicle.

3. A vehicle navigation system as set forth in claim 1, wherein the intersection detecting means detects whether the vehicle has passed the intersection based on a beacon wave generated from a signpost set up in a vicinity of the intersection.

4. A vehicle navigating method for navigating a vehicle along a predetermined route, comprising steps of:

storing information about the predetermined route to a destination;

detecting a present position of the vehicle;

displaying map information and a mark representing the present vehicle position relative to the map information on a display in a first display format in which the mark moves substantially continuously relative to the map information as the position of the vehicle changes;

displaying the map information and the mark in a second display format responsive to the vehicle reaching a predetermined distance before an intersection contained along the predetermined route, wherein in the second display format, the mark is moved in increments relative to the map information toward a displayed intersection corresponding to the intersection being approached by the vehicle as the vehicle approaches the intersection and is maintained at the intersection until the vehicle has passed the intersection;

detecting a passage of the intersection contained along the predetermined route to the destination by the vehicle; and terminating the second display format responsive to the passage of the intersection by the vehicle is detected.

5. A vehicle navigating method as set forth in claim 4, wherein the step of detecting a passage of an intersection is based on a change in a travelling direction of the vehicle.

6. A vehicle navigating method as set forth in claim 4, wherein the step of detecting a passage of an intersection is based on a beacon wave generated from a signpost set up in a vicinity of the intersection.

7. A vehicle navigation system for navigating a vehicle along a predetermined route, comprising:

storing means for storing information about the predetermined route to a destination;

position detecting means for detecting a present vehicle position;

displaying means for displaying map information and a mark representing the present vehicle position relative to the map information;

intersection detecting means for detecting whether the vehicle has passed an intersection in the predetermined route to the destination; and display control means for operating the displaying means in a first display format in which the mark moves substantially continuously relative to the map information as the position of the vehicle changes and for operating the displaying means in a second display format, the display control means switching the displaying means from the first display format to the second display format responsive to the vehicle reaching a predetermined distance before the intersection, and terminating the second display format responsive to the intersection detecting means determining that the vehicle has passed the intersection, wherein the second display format includes moving the mark in discrete steps relative to the map information toward a displayed intersection corresponding to the intersection being approached by the vehicle as the vehicle approaches the intersection.

8. A vehicle navigation system as set forth in claim 7, wherein the intersection detecting means detects whether the vehicle has passed the intersection based on a change in a travelling direction of the vehicle.

9. A vehicle navigation system as set forth in claim 7, wherein the intersection detecting means detects whether the vehicle has passed the intersection based on a beacon wave generated from a signpost set up in a vicinity of the intersection.

10. A vehicle navigating method for navigating a vehicle along a predetermined route, comprising steps of:

storing information about the predetermined route to a destination;

detecting a present position of the vehicle;

displaying map information and a mark representing the present vehicle position relative to the map information on a display in a first display format in which the mark moves substantially continuously relative to the map information as the position of the vehicle changes;

displaying the map information and the mark in a second display format responsive to the vehicle reaching a predetermined distance before an intersection contained along the predetermined route, wherein in the second display format, the mark is moved in discrete steps relative to the map information toward the intersection being approached by the vehicle as the vehicle approaches the intersection;

detecting a passage of the intersection contained along the predetermined route to the destination by the vehicle; and terminating the second display format responsive to the passage of the intersection by the vehicle being detected.

11. A vehicle navigating method as set forth in claim 10, wherein the step of detecting a passage of an intersection is based on a change in a travelling direction of the vehicle.

12. A vehicle navigating method as set forth in claim 10, wherein the step of detecting a passage of an intersection is based on a beacon wave generated from a signpost set up in a vicinity of the intersection.

* * * * *